United States Patent
Giladi

(10) Patent No.: US 9,246,971 B2
(45) Date of Patent: Jan. 26, 2016

(54) SYSTEM AND METHOD FOR SEGMENT DEMARCATION AND IDENTIFICATION IN ADAPTIVE STREAMING

(71) Applicant: FutureWei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 313 days.

(21) Appl. No.: 14/020,227

(22) Filed: Sep. 6, 2013

(65) Prior Publication Data

US 2014/0075042 A1 Mar. 13, 2014

Related U.S. Application Data

(60) Provisional application No. 61/698,259, filed on Sep. 7, 2012.

(51) Int. Cl.
*G06F 15/16* (2006.01)
*H04L 29/06* (2006.01)

(52) U.S. Cl.
CPC .......... *H04L 65/607* (2013.01); *H04L 65/4084* (2013.01); *H04L 65/605* (2013.01)

(58) Field of Classification Search
CPC .......................... H04L 67/607; H04L 65/4084
See application file for complete search history.

(56) References Cited

U.S. PATENT DOCUMENTS

| | | | | |
|---|---|---|---|---|
| 6,704,602 B2 * | 3/2004 | Berg | ........ | A61N 1/3727 607/60 |
| 7,173,943 B1 * | 2/2007 | Borchew | ........ | H04L 43/18 370/366 |
| 7,773,630 B2 * | 8/2010 | Huang | ........ | H04L 47/10 370/474 |
| 7,809,018 B2 * | 10/2010 | Ehret | ........ | G10L 19/167 370/466 |
| 7,849,475 B2 * | 12/2010 | Covell | ........ | G06K 9/00711 725/22 |
| 8,284,802 B2 * | 10/2012 | Huang | ........ | H04L 47/10 370/474 |
| 8,584,158 B2 * | 11/2013 | Covell | ........ | G06K 9/00711 725/28 |
| 2002/0099423 A1 * | 7/2002 | Berg | ........ | A61N 1/3727 607/60 |
| 2010/0189183 A1 | 7/2010 | Gu et al. | | |

(Continued)

OTHER PUBLICATIONS

3GPP 3rd Generation Partnership Project; Technical Specification Group Core Network and Terminals; Access to the 3GPP Evolved Packet Core (EPC) via non-3GPP Access Networks; Stage 3 Release 11) 3GPP TS 24.302 v11.3.0, Jun. 2012, 60 pages.

(Continued)

*Primary Examiner* — Moustafa M Meky
(74) *Attorney, Agent, or Firm* — Slater & Matsil, L.L.P.

(57) ABSTRACT

Embodiments are provided for segment demarcation and identification in adaptive streaming by enabling marking chunks according to multiple standards simultaneously. An encoder boundary point (EBP) structure is used to indicate a plurality of partitions corresponding to a plurality of representations for a same content. A partition is a set of continuous chunks within a media stream of a defined length according to a corresponding standard. The EBP structure includes a bit-mask that is set to indicate one or more partitions in the stream. The EBP structure can indicate a boundary point for more than two partitions allowing a stream to be partitioned in several ways according to different standards. Additionally, a program map table (PMT) descriptor is used to describe each partition, providing information to process each partition. The PMT descriptor includes a packet identifier (PID) value for packets containing EBP structures.

20 Claims, 3 Drawing Sheets

(56) References Cited

U.S. PATENT DOCUMENTS

| | | | |
|---|---|---|---|
| 2011/0087721 A1* | 4/2011 | Huang | H04L 47/10 709/201 |
| 2011/0119395 A1 | 5/2011 | Ha et al. | |
| 2011/0234755 A1 | 9/2011 | Suh et al. | |
| 2011/0270913 A1 | 11/2011 | Jarnikov | |
| 2012/0144445 A1 | 6/2012 | Bonta et al. | |

OTHER PUBLICATIONS

ITU-T Recommendation H. 222.0; Series H. Audio Visual and Multimedia Systems Infrastructure of audiovisual services—Transmission multiplexing and synchronization; Information technology—Generic coding of moving pictures and associated audio information: Systems, May 2012, 234 pages.

Society of Cable Telecommunications Engineers, "Encoder Boundary Point Standard," Engineering Committee (Digital Video Subcommittee), Document: DVS 1151, Date of Submission: Aug. 8, 2013, 29 pages.

International Search Report received in Application No. PCT/US2013/058597, Applicant: Huawei Technologies Co., Ltd., mailed Mar. 20, 2014, 7 pages.

CableLabs, OpenCable Specifications, "Content Encoding Profiles 3.0 Specification," www.cablelabs.com/certqual/trademarks, http://www.cablelabs.com/wp-content/uploads/specdocs/OC-SP-CEP3.0-I03-120123.pdf, Jan. 23, 2012, 48 pages.

CableLabs, OpenCable Specifications, Encoder Boundary Point Specification, www.cablelabs.com/certqual/trademarks, http://www.cablelabs.com/wp-content/uploads/specdocs/OC-SP-EBP-I01-130118.pdf, Jan. 18, 2013, 31 pages.

* cited by examiner

SYSTEM AND METHOD FOR SEGMENT DEMARCATION AND IDENTIFICATION IN ADAPTIVE STREAMING

This application claims the benefit of U.S. Provisional Application No. 61/698,259 filed on Sep. 7, 2012 by Alexander Giladi and entitled "System and Method for Segment Demarcation and Identification in Adaptive Streaming," which is hereby incorporated herein by reference as if reproduced in its entirety.

TECHNICAL FIELD

The present invention relates to the field of content streaming, and, in particular embodiments, to a system and method for segment demarcation and identification in adaptive streaming.

BACKGROUND

While traditional Internet Protocol television (IPTV) uses continuous transport streams, adaptive bitrate (ABR) Hypertext Transfer Protocol (HTTP) streaming uses discrete addressable chunks of data, typically files, or byte ranges within a file. A typical model for a multiple system operator (MSO)-operated content delivery network (CDN) is traditional IPTV-style multicasts distributed within the core network, the contents of which is converted at the edge to discrete chunks and served via HTTP to clients. Streams (and consequently chunks) provide different representations of the same content. In other words, representations are renditions of same content which have different properties such as bitrate, resolution, or other content related properties. The CableLabs encoder boundary point (EBP) specification relates to marking these traditional IPTV-style multicast streams to allow low-complexity conversion into discrete chunks. As conversion is made into different ABR streaming standards, different borders are needed for different standards, such as 10 second chunks are often used with Apple HTTP Live Streaming (HLS), and 2 second chunks are a common practice for Microsoft SmoothStreaming. As such, efficient system and method are needed for using EBP to support multiple standards and segmentation modes.

SUMMARY OF THE INVENTION

In accordance with an embodiment, a method implemented by a network component for marking chunks in a transport stream includes indicating, using a bit-mask in an encoder boundary point (EBP) structure, a plurality of partitions corresponding to a plurality of representations for a same content. The method further includes inserting the EBP structure in a transport stream, and sending the EBP structure in a packet.

In accordance with another embodiment, a method implemented by a network component for handling chunks in a transport stream includes receiving, in a transport stream, a packet comprising an EBP structure. The method further includes detecting, in the EBP structure, a bit-mask indicating a plurality of partitions corresponding to a plurality of representations for a same content, and truncating the transport stream in accordance with the partitions.

In accordance with another embodiment, a network component for marking chunks in a transport stream includes at least one processor and a non-transitory computer readable storage medium storing programming for execution by the at least one processor. The programming includes instructions to indicate, using a bit-mask in an EBP structure, a plurality of partitions corresponding to a plurality of representations for a same content. The programming further configures the network component to insert the EBP structure in a transport stream, and send the EBP structure in a packet.

In accordance with yet another embodiment, a network component for handling chunks in a transport stream includes at least one processor and a non-transitory computer readable storage medium storing programming for execution by the at least one processor. The programming including instructions to receive, in a transport stream, a packet comprising an EBP structure. The programming further configures the network component to detect, in the EBP structure, a bit-mask indicating a plurality of partitions corresponding to a plurality of representations for a same content, and truncate the transport stream in accordance with the partitions.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
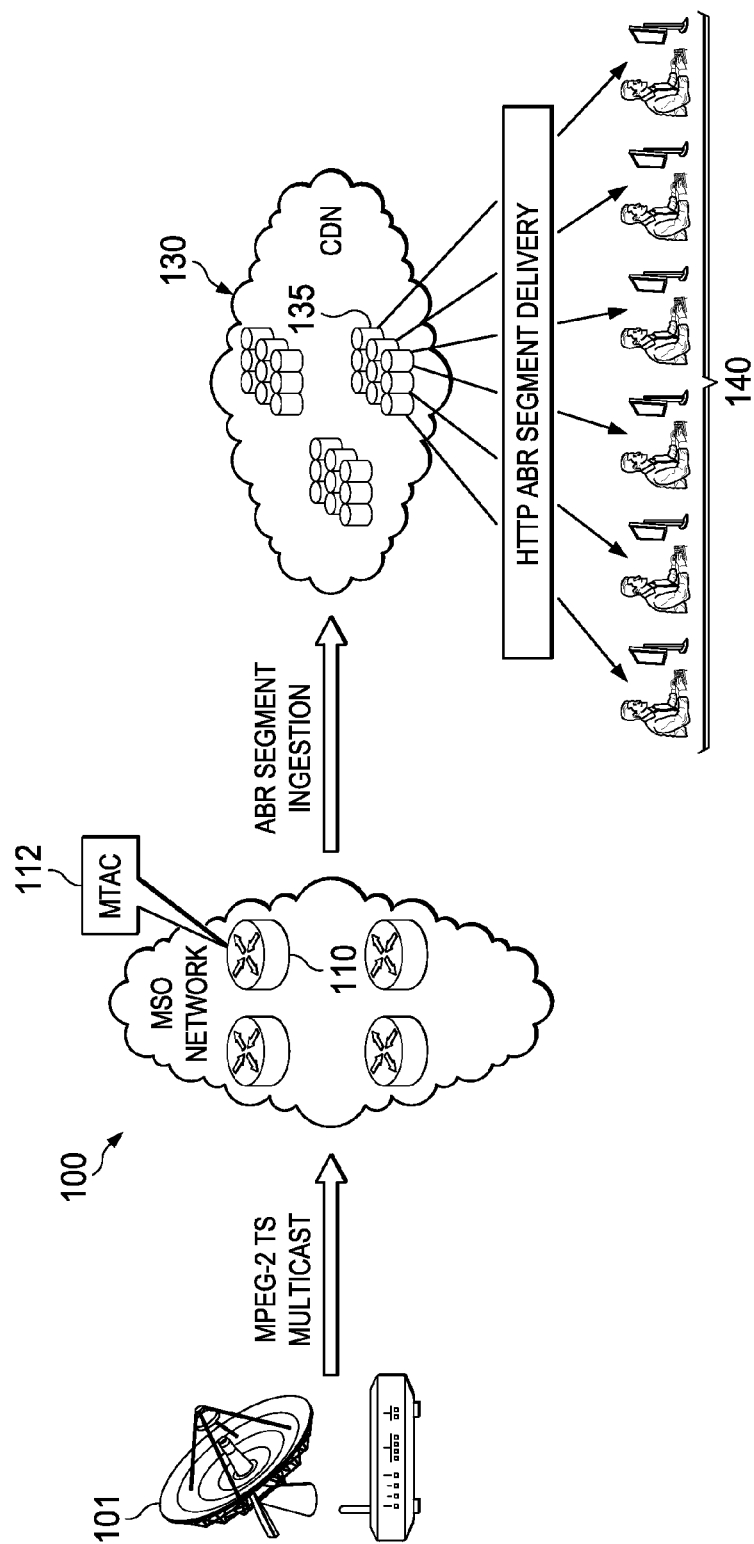
FIG. 1 illustrates an example of a MSO-operated network for distributing/streaming media.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The CableLabs Encoder Boundary Point (EBP) specifies signaling for partitioning a continuous stream into chunks, using an EBP structure. More than one partitioning can be specified in the EBP structure at the same time. The EBP may be carried as private data bytes in the adaptation field of an MPEG-2 TS packet.

However, there are more than just two ABR standards and formats that need to be simultaneously supported by the EBP structure, for example, simultaneous use of Apple HLS, Microsoft SmoothStreaming, Adobe HTTP Dynamic Streaming (HDS), and different variations of Dynamic Adaptive Streaming over HTTP (DASH), including several different modes of segmentation for DASH, on the same stream. These formats require different segment or partition lengths. It is not possible to support multiple standards and multiple segmentation modes with the current EBP structure proposal since the current standards do not allow marking segment borders for more than two different standards. Further, there is no current support for identifying more than two standards and for indexing the identified standards.

System and method embodiments are provided herein for segment demarcation and identification in adaptive streaming by enabling marking segment borders in streams for more than two standards (segments and fragments). To resolve the EBP issues discussed above, a partition concept, also may be referred to as a timeline, is added to the EBP structure. The EBP is extended to accommodate multiple partitions (or timelines), such that an EBP structure can belong to (or mark the start of) one or more partitions. The partition may be a set of continuous chunks within a media stream of a defined length according to a corresponding standard. The EBP structure can indicate a boundary point for one or multiple partitions allowing a stream to be partitioned in several ways according to different standards. For example, the EBP structure may indicate a first partition that corresponds to 2-second chunks and a second partition that corresponds to 5-second chunks. A partition associated with a standard can thus be represented by a series of boundary points across a group of elementary streams, where each boundary point is indicated by an EBP structure in the streams. Additionally, a program map table (PMT) descriptor is used to describe each partition, providing information to process (at a receiver or an in-network device) each partition, such as identification of packet ID (PID) value for packets containing EBP structure for a given representation (e.g., for each elementary stream or complete program), identification of memory requirements, and other information. The EBP structure marks the beginning of one or more partitions in a stream, while the PMT descriptor provides information for processing the partitions. The EBP structure and PMT descriptor can be sent form any suitable transmitter component and received/processed by another suitable receiver component in a MSO-operated CDN system for streaming content (e.g., audio/video). For example, the two information structures may be sent from an encoder to a content server, from a content server or caches to edge nodes in a CDN, or from network edge nodes to clients.

The schemes above may be used for MPEG-2 transport stream (TS) conversion to adaptive bitrate (ABR) segments according to the indicated partitions for different standards. Alternative methods for segment border demarcation, identification and index generation information, and synchronization information in MPEG-2 TS content may be provided using program specific information (PSI), or using ANSI/SCTE 35 messages.

A Dynamic Adaptive Streaming over Hypertext Transfer Protocol (DASH) MPD can be used for describing groups of transport streams with corresponding partitions. For example, multicast MPEG-2 TS feeds arriving via satellite or fiber network can be converted into discrete chunks suitable for adaptive streaming (e.g., into different size DASH segments) ready to be used for live and/or personal video recorder (PVR) applications. CDNs and edge equipment may use the segment demarcation and identification schemes to handle the conversion into multiple adaptive streaming standards. The schemes can be implemented in CDNs and edge systems, which are used by cable, IPTV and telecommunication operators.

FIG. 1 illustrates an example of a MSO-operated network 100 for distributing/streaming content. The network 100 includes an edge node 110 comprising a multicast-to-ABR streaming converter (MTAC) 120. The MTAC 120 outputs media and index segments to an origin server at a CDN 130. Updated media presentation descriptions (MPDs) are also available from the origin server. Segments and MPDs are then accessed by the ABR clients 140 from the CDN 130, for instance via caches 135. Motion Picture Experts Group (MPEG)-2 TS multicast feeds, for example, from a satellite 101 (or a fiber network for example), are received by the MSO-operated network 100. The MTAC 110 hence converts the multicast feeds into ABR segments that are sent to the CDN 130, which then distributes the ABR segments to various users or clients 140. Any two communicating components in the network 100 can exchange the EBP structure and PMT descriptor to partition the stream according to different standards.

The partition concept is added by modifying an EBP structure or information (labeled EBP_info) in current specification, as shown in Table 1 below using syntax specified in MPEG-2 Systems standard, ISO/IEC 13818-1. The "if (EBP_extension_flag==1) { . . . }" and the "if (EBP_ext_partition_flag==1) { . . . }" statements are added to the modified EBP structure. Table 1 also shows the number of bits per field and the field type. As specified in ISO/IEC 13818-1, the type "uimsbf" represents unsigned integer translated most significant bit first, and the type "bslbf" represents bit string left bit first.

TABLE 1

Syntax of EBP_info( ).

| Syntax | No. of bits | Format |
|---|---|---|
| EBP_info( ) { | | |
|   data_field_tag | 8 | uimbsf |
|   data_field_length | 8 | uimbsf |
|   format_identifier | 32 | uimbsf |
|   EBP_fragment_flag | 1 | bslbf |
|   EBP_segment_flag | 1 | bslbf |
|   EBP_SAP_flag | 1 | bslbf |
|   EBP_grouping_flag | 1 | bslbf |
|   EBP_time_flag | 1 | bslbf |
|   EBP_concealment_flag | 1 | bslbf |
|   EBP_reserved_flag | 1 | bslbf |
|   EBP_extension_flag | 1 | bslbf |
|   If (EBP_extension_flag==1) { | | |
|     EBP_ext_partition_flag | 1 | bslbf |
|     Reserved | 7 | '0000000' |
|   } | | |
|   if (EBP_SAP_flag==1 ){ | | |
|     EBP_SAP_type | 3 | uimbsf |
|     reserved | 5 | '00000' |
|   } | | |
|   if (EBP_grouping_flag==1 ){ | | |
|     EBP_grouping_ext_flag | 1 | bslbf |
|     EBP_grouping_id | 7 | uimbsf |
|     While (EBP_grouping_ext_flag==1 ){ | | |
|       EBP_grouping_ext_flag | | |
|       EBP_grouping_id | 1 | bslbf |
|     } | 7 | uimbsf |
|   } | | |
|   if (EBP_time_flag==1 ){ | | |
|     EBP_acquisition_time | | |
|   } | 64 | uimbsf |
|   if (EBP_ext_partition_flag==1 ){ | | |

TABLE 1-continued

Syntax of EBP_info( ).

| Syntax | No. of bits | Format |
|---|---|---|
| EBP_ext_partitions | 8 | uimbsf |
| } | | |
| For (i=0; i<n; i++) { | | |
| EBP_reserved_byte | 8 | uimbsf |
| } | | |
| } | | |

The following summarizes the fields in Table 1 and the corresponding description:

data_field_tag: The data field tag is an 8-bit field which identifies the type of each data field.

data_field_length: This field is the number of bytes following this length field.

format_identifier: This field is defined according to an International Organization for Standardization (ISO)/International Electrotechnical Commission (IEC) standard.

EBP_fragment_flag: Bit flag to indicate the start of a specific type of chunk (a fragment) in the stream.

EBP_segment_flag: Bit flag to indicate the start of a specific type of chunk (a segment) in the stream. A segment typically contains one or more fragments and is usually aligned with fragments. In this case, EBP_fragment_flag is set when EBP_segment_flag is set. It is possible that a segment can start within a fragment, in which case EBP_fragment_flag is not set when EBP_segment_flag is set.

EBP_SAP_flag: Bit flag to indicate stream access point type at the start of a boundary point, as defined in an ISO/IEC standard. If bit flag is clear, the boundary point meets the requirements for SAP type 1 or 2. If the bit flag is "1", indicates that the EBP_SAP_type is present.

EBP_grouping_flag: Bit flag to indicate the presence of the grouping information. A group indicates a continuous set of AUs which can be independent of the GOP structure. Default is '0' unless grouping information needs to be included.

EBP_time_flag: Bit flag to indicate if a Network Time Protocol (NTP)-derived acquisition time is included in this EBP structure (in the EBP_acquisition_time field, below). This flag is expected to be '0' for non-live content.

EBP_concealment_ flag: Bit flag to indicate if encoder repaired the source stream that may have lost a frame that was at a boundary point. "Repair" is meant to create a boundary point where it may have been skipped due to a lost boundary point frame. The value "1" indicates a repaired frame, and "0" indicates no repairs done to the stream.

EBP_ext_partition_flag: Bit flag indicating the presence of the extended partition field in this structure.

EBP_reserved_flag: Reserved bit(s) for future bit flag use.

EBP_extension_flag: Bit flag that indicates an extension byte is in use for additional bit flags.

EBP_SAP_type: 3 bits to indicate SAP type.

EBP_grouping_ext_flag: Bit flag used to allow for multiple grouping_ids to belong in the same EBP structure. If flag bit is "1", it would indicate another grouping_id would follow. If the flag is clear, then that grouping ID is the only or last grouping_id.

EBP_grouping_id: 7 bits to indicate group number or group pattern.

EBP_acquisition_time: 64-bit NTP timestamp of the boundary point or AU. Time can be acquired through an NTP mechanism. The content of this field is undefined for non-live content.

EBP_ext_partitions: This is an added field to the EBP structure to introduce the partition(s) (also referred to as timeline(s)) concept. The field serves as a bitmask representing all partitions to which this boundary point (EBP structure or information) applies. The EBP_ext_partitions is a bitmask indexed by a partition_id field described below. For example, the bit-mask may include 8 bits for indicating extended partitions (e.g., bits 3-9), in addition to two bits used as segment and fragment flags, respectively (e.g., bits 1 and 2).

EBP_reserved_byte: Reserved byte for future use.

Table 2 illustrates a PMT descriptor (labeled ebp_descriptor) that can be used, for example in PMT loop or in elementary stream (ES) loop, to provide a receiver of the EBP structure for processing the partitions in the stream and for other uses, such as synchronization. The descriptor indicates an EBP PID. The EBP ID may be the PID on which the EBP marks for the whole program appear (if carried at program level), or the PID that contains EBP marks for the current ES (if carried at ES level). The "num_partitions", "ebp_data_explicit_flag", "representation_id_flag", "partition_id", "if (ebp_data_explicit_flag==0){ . . . }" statement, and "boundary_flag" are added to the PMT descriptor. Table 2 also shows the number of bits per field and the field type. The type "uimsbr" represents unsigned integer translated most significant bit first, and the type "bslbf"" represents bit string left bit first.

TABLE 2

Syntax of ebp_descriptor( ).

| Syntax | No. of bits | Format |
|---|---|---|
| ebp_descriptor( ){ | | |
| descriptor_tag | 8 | uimbsf |
| descriptor_length | 8 | uimbsf |
| if (descriptor_length > 0) | | |
| { | | |
| num_partitions | 5 | uimbsf |
| timescale_flag | 1 | bslbf |
| reserved | 2 | bslbf |
| if (timescale_flag == 1 ) | | |
| { | | |
| ticks_per_second | 21 | bslbf |
| ebp_distance_width_minus_1 | 3 | bslbf |
| } | | |
| for ( i = 0; i < num_partitions; i++ ) | | |
| { | | |
| ebp_data_explicit_flag | 1 | bslbf |
| representation_id_flag | 1 | bslbf |
| partition_id | 5 | uimbsf |
| if ( ebp_data_explicit_flag == 0 ) | | |
| { | | |
| reserved | 1 | bslbf |
| ebp_pid | 13 | bslbf |
| reserved | 3 | uimbsf |
| } | | |
| else | | |
| { | | |
| boundary_flag | 1 | uimbsf |
| ebp_distance | N | bslbf |
| if ( boundary_flag == 1) | | |
| { | | |
| SAP_type_max | 3 | uimbsf |
| reserved | 4 | bslbf |
| } | | |
| else | | |
| { | | |
| reserved | 7 | uimbsf |
| } | | |
| acquisition_time_flag | 1 | bslbf |
| } | | |
| if ( representation_id_flag == 1 ) | | |
| { | | |

TABLE 2-continued

Syntax of ebp_descriptor( ).

| Syntax | No. of bits | Format |
|---|---|---|
| representation_id<br>}<br>}<br>}<br>} | 64 | uimbsf |

The following summarizes the fields in Table 1 and the corresponding description:

descriptor_tag: This 8-bit unsigned integer has a defined value, identifying this descriptor as ebp_descriptor( )

descriptor_length: This 8-bit unsigned integer specifies the length (in bytes) immediately following this field up to the end of this descriptor.

timescale_flag: Bit flag to indicate the presence of timescale information. If "0", ticks_per_second is assumed to be "1" and ebp_distance_width_minus_1 is assumed to be "0".

ticks_per_second: Precision, in ticks per second, of the ebp_distance field, e.g., 0.1 sec precision is 10 ticks/sec, 0.01 sec precision with 100 ticks/sec, etc.

ebp_distance_width_minus_1: Length, in bytes (minus one), of the ebp_distance field. This means that the value 0 indicates 8-bit ebp_distance field, 1-16 bit, etc. The expectation is that in the vast majority of cases the value is 0.

num_partitions: This field is added to indicate the number of partitions in the loop (e.g., the entire represented data structure).

representation_id_flag: Bit flag to indicate that a representation ID is used.

ebp_data_explicit_flag: If set to 0, then this ES is a dependent stream, and boundary data for it is provided on a reference partition on a different PID, specified by ebp_pid. Otherwise, the current PID carries EBP structures.

partition_id: This is the id of the partition described. If ebp_data_explicit_flag is set to 0, then this is the partition_id of a reference partition on the ebp_pid.

ebp_pid: This is the associated PID carrying EBP structures that are used to partition this particular PID elementary stream.

boundary_flag: Bit flag that if set to '0'. The partition is used for marking a frame. Otherwise, it is used for indicating a chunk boundary point.

representation_id: This is a 64-bit opaque label identifying the representation. If ebp_data_explicit_flag is set to 0, then this is the representation_id of a reference partition on the ebp_pid.

ebp_distance: expected distance in time slice ticks between two EBP structures with the same partition. This is an N-byte integer, where N=ebp_distance_width_minus_1+1.

SAP_type_max: maximum possible value of EBP_SAP_type field in the EBP structure. If EBP_sap_flag is 0 in all EBP structures associated with this partition, then the value of SAP_type_max is 2.

acquisition_time_flag: Bit flag that if set to 1, the value of EBP_time_flag in any EBP structure associated with this partition is 1.

To correlate the EBP descriptor with a DASH MPD in the stream, the representation_id field above corresponds to a Representation ID in DASH MPD. Different descriptors carry an identifier for the whole group of transport streams, which correlate with a MPD ID and a publication date. The DASH MPD is used to describe the files/multicasts, and non-HTTP representations need to be added to it. This provides reliable forward and reverse mapping between MPEG-2 TS streams that are a representation described by the MPD Representation element.

Using the EBP structure, partitions are sets of continuous chunks (in case partition is used for carrying boundary information) or sets of marked packets (if used, e.g., to carry acquisition times). Boundary partitions allow multiple chunking timelines to be associated with a content stream to meet the chunking requirements of different ABR delivery formats. A typical application of boundary partitions may be to associate one or more ABR formats with a unique partition_id. Three reserved values of boundary partition_id are defined: partition_id=1 corresponds to segments, partition_id=2 corresponds to fragments, and partition_id=0 is used to indicate non-boundary EBPs, e.g., EBPs carrying only acquisition times. It is possible to use more partitions than defined above, for example, extended partitions 3-9 can be used for any purpose. All non-boundary EBP structures implicitly belong to partition 0. However, an implementer may choose not to use partition 0 and use instead an extended partition for non-boundary use. The purpose and frequency of a partition are specified in the PMT descriptor (the ebp_descriptor( ) of Table 2). For a given PID, a partition can be explicit or implicit. An explicit partition is one which is used in the EBP structures carried on this PID, while an implicit partition is a reference to an explicit partition carried on a different PID (and, possibly, in a different multiplex).

Figure 2:
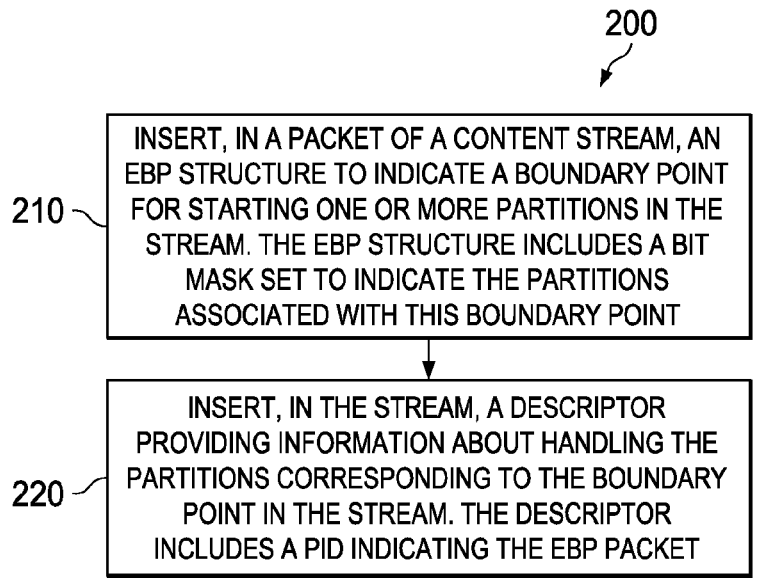
FIG. 2 illustrates an embodiment of a method for indicating a plurality of partitions in a stream.

FIG. 2 illustrates an embodiment of a method 200 for indicating a plurality of partitions in a stream. The method 200 may be implemented by any transmitting or encoding component in a content distributing system supporting adaptive streams. At step 210, an EBP structure is inserted and configured in a packet of the stream to indicate a boundary point for starting one or more partitions in the stream. The EBP structure includes a bit-mask set to indicate the partitions associated with this boundary point. The EBP structure is configured as EBP_info( ) structure in Table 1. The EBP_ext_partition_flag in the EBP_info( ) structure is set to 1 to indicate the presence of the extended partition field in this structure. The bit-mask EBP_ext_partitions field is set to indicate the partitions associated with this boundary point (marked by the EBP structure in the stream). The bits 0, 1, and 2 of the bitmask are used to indicate a non-boundary EBP structure, a segment based partitions, and fragment based partitions, respectively. The remaining bits (bits 3-9) may represent extended partitions of defined length according to associated standards. Multiple bits in the bitmask may be set to indicate a boundary point for multiple partitions of the stream. At step 220, a descriptor is inserted and configured in the stream to provide information about handling each of the partitions in the stream that correspond to the boundary point. The descriptor includes a PID indicating the EBP packet inserted in step 210. The descriptor is configured as ebp_descriptor( ) in Table 2. The num_partitions field in the ebp_descriptor( ) is set to indicate the number of partitions used for a represented data structure in the stream. The ebp_data_explicit_flag field is set to 0 if the stream is dependent on another stream, and boundary data for it is provided on a reference partition on a different PID, specified by the ebp_pid field. Otherwise, the current PID carries EBP structures. The representation_id_flag is set if the representation_id field is used. The partition_id is set to indicate a corresponding partition of the EBP_ext_partitions bit-mask in EBP_info( ). The ebp_pid is set to indicate the PID carrying EBP structures that are used to partition this particular PID elementary stream. The boundary_flag is set to 0 if the indicated partition is used for marking a frame. Otherwise, the partition is used for indicating a chunk boundary point. If used, the representation_id field is set to identify a representation corresponding to this partition. The representation_id field may be used to correlate with a Representation ID in DASH MPD.

Figure 3:
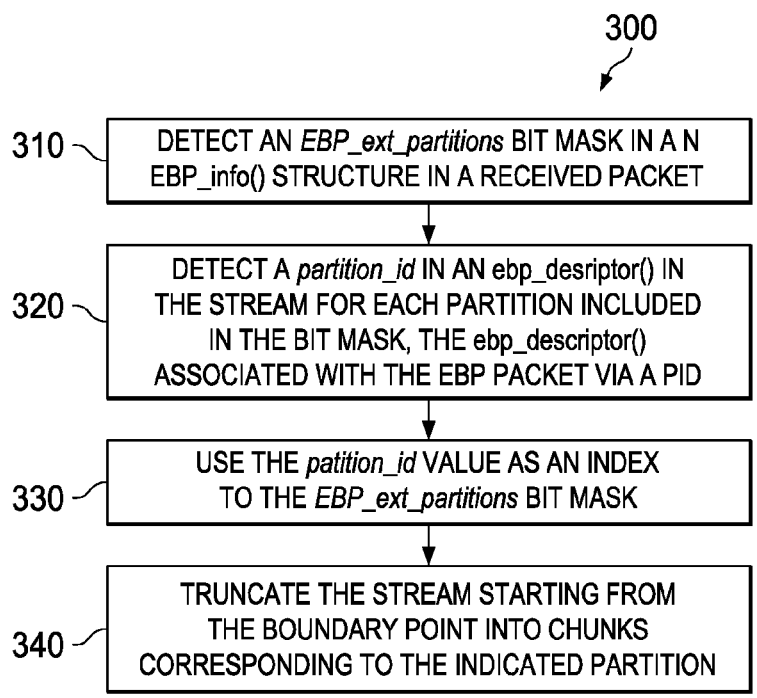
FIG. 3 illustrates an embodiment of a method for detecting a plurality of partitions in a stream.

FIG. 3 illustrates an embodiment of a method 300 for detecting a plurality of partitions in a stream. The method 300 may be implemented by any receiving or parsing component in a content distributing system supporting adaptive streams. At step 310, an EBP_ext_partitions bit-mask is detected in an EBP_info( ) structure in a received packet. The EBP_ext_partitions bit-mask may be detected if an EBP_extension_flag and an EBP_ext_partition_flag in the structure are set. At step 320, a partition_id for each partition indicated in the bit-mask is detected in an ebp_descriptor( ) in the stream, the ebp_descriptor( ) associated with the EBP packet via a PID. The partition is indicated in the bit-mask when it corresponding bit is set (e.g., to 1) in the bit-mask. At step 330, the partition_id value is used as an index to the EBP_ext_partitions bit-mask. If the value is 1, then the partition is treated as a segment, if the value is 2, then the partition is treated as a fragment, and if the value is 0, then the EBP structure is not treated as a boundary point. For other index value, the bit-mask position is checked. If the position is set (e.g., to 1), then the boundary point starts a partition associated with that index value, e.g., has a length or duration according to a corresponding defined standard. At step 340, the stream is truncated into chunks corresponding to the indicated partition.

Figure 4:
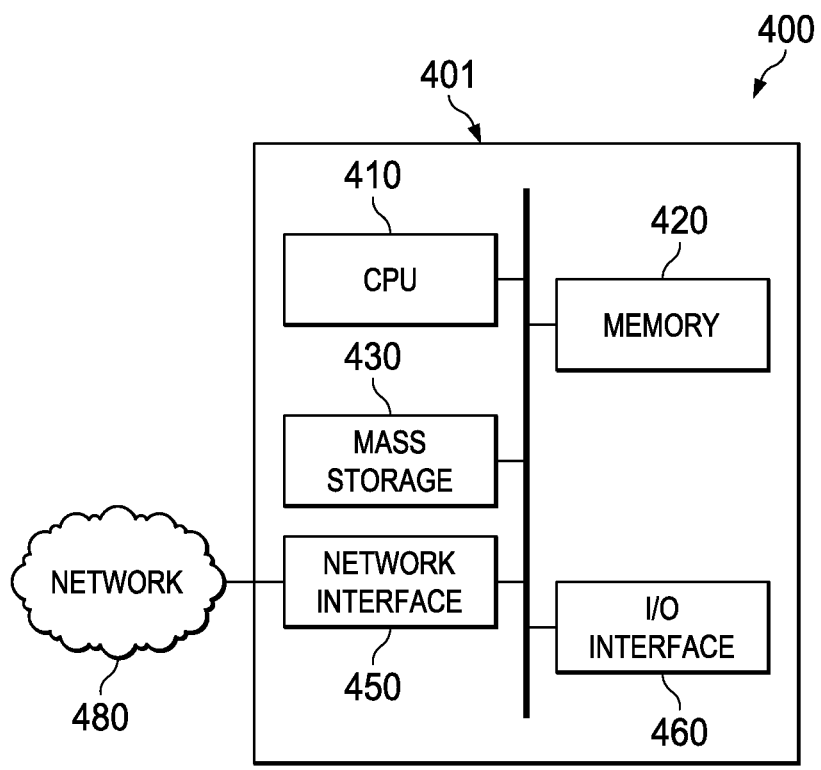
FIG. 4 is a diagram of an exemplary processing system that can be used to implement various embodiments.

FIG. 4 is a block diagram of an exemplary processing system 400 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral bus or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, implemented by a network component for marking chunks in a transport stream, the method comprising:
    indicating, using a bit-mask in an encoder boundary point (EBP) structure, a plurality of partitions corresponding to a plurality of representations for a same content;
    inserting the EBP structure in a transport stream; and
    sending the EBP structure in a packet.

2. The method of claim 1, further comprising:
    identifying, in a program map table (PMT) descriptor, each partition of the partitions indicated in the EBP structure using a corresponding index to the bit-mask of the EBP structure; and
    adding to the PMT descriptor a packet identifier (PID) for packets containing the EBP structure.

3. The method of claim 2, wherein the index to the bit-mask of the EBP structure is a partition identifier (ID) field specified in the PMT descriptor.

4. The method of claim 3 further comprising setting the partition ID to 0 indicating a non-boundary EBP structure, to 1 indicating a segment partition, or to 2 indicating a fragment partition.

5. The method of claim 2 further comprising describing each partition of the partitions indicated in the EBP structure using a plurality of fields in the PMT descriptor including at least one of an EBP data explicit flag, a representation flag, a boundary flag, and optionally a representation ID.

6. The method of claim 5 further comprising setting the EBP data explicit flag to indicate that the packet associated with the PID carries EBP structures, or to indicate that the transport stream is a dependent stream and boundary data for the transport stream is provided on a reference partition on a different PID.

7. The method of claim 5 further comprising setting the boundary flag to indicate that the partition is used for marking a frame, or to indicate that the partition is used for designating a chunk boundary point.

8. The method of claim 5, wherein the representation ID indicates a representation of the content using the partition.

9. The method of claim 1, wherein each partition of the partitions is a set of continuous chunks of content in the transport stream, and wherein the chunks have a defined approximate duration.

10. The method of claim 1 further comprising setting, for each indicated partition in the EBP structure in the in the transport stream, a corresponding bit in the bit-mask.

11. The method of claim 1 further comprising setting at least one of an EBP extension flag and an EBP extension partition flag in the EBP structure.

12. The method of claim 1, wherein the bit-mask has a bit-size larger than three bits.

13. A method implemented by a network component for handling chunks in a transport stream, the method comprising:
receiving, in a transport stream, a packet comprising an encoder boundary point (EBP) structure;
detecting, in the EBP structure, a bit-mask indicating a plurality of partitions corresponding to a plurality of representations for a same content; and
truncating the transport stream in accordance with the partitions.

14. The method of claim 13 further comprising:
receiving, in the transport stream, a program map table (PMT) descriptor including a packet identifier (PID) for packets containing the EBP structure;
detecting, in the PMT descriptor, a partition identifier (ID) for each partition of the partitions indicated in the EBP structure, wherein the partition ID is an index to a corresponding bit in the bit-mask of the EBP structure; and
obtaining information for each partition of the partitions indicated in the EBP structure from the PMT descriptor; and
processing the partition in the transport stream in accordance with the information.

15. The method of claim 14, wherein detecting the bit-mask indicating the plurality of partitions comprises detecting a bit set to 1 for each indicated partition in the bit-mask.

16. A network component for marking chunks in a transport stream, the network component comprising:
at least one processor; and
a non-transitory computer readable storage medium storing programming for execution by the at least one processor, the programming including instructions to:
indicate, using a bit-mask in an encoder boundary point (EBP) structure, a plurality of partitions corresponding to a plurality of representations for a same content;
insert the EBP structure in a transport stream; and
send the EBP structure in a packet.

17. The network component of claim 16, wherein the programming includes further instructions to:
identify, in a program map table (PMT) descriptor, each partition of the partitions indicated in the EBP structure using a corresponding index to the bit-mask of the EBP structure; and
add to the PMT descriptor a packet identifier (PID) for packets containing the EBP structure.

18. The network component of claim 16, wherein the bit-mask comprises 10 bits for indicating up to 10 partitions of different defined lengths according to corresponding standards.

19. A network component for handling chunks in a transport stream, the network component comprising:
at least one processor; and
a non-transitory computer readable storage medium storing programming for execution by the at least one processor, the programming including instructions to:
receive, in a transport stream, a packet comprising an encoder boundary point (EBP) structure;
detect, in the EBP structure, a bit-mask indicating a plurality of partitions corresponding to a plurality of representations for a same content; and
truncate the transport stream in accordance with the partitions.

20. The network component of claim 19, wherein the programming includes further instructions to:
receive, in the transport stream, a program map table (PMT) descriptor including a packet identifier (PID) for packets containing the EBP structure;
detect, in the PMT descriptor, a partition identifier (ID) for each partition of the partitions indicated in the EBP structure, wherein the partition ID is an index to a corresponding bit that is set in the bit-mask of the EBP structure;
obtain information for each partition of the partitions indicated in the EBP structure from the PMT descriptor; and
process the partition in the transport stream in accordance with the information.

* * * * *